Jan. 20, 1953     W. T. MILLER ET AL     2,626,254

METHOD OF POLYMERIZING TRIFLUOROCHLOROETHYLENE

Filed Nov. 29, 1948

*INVENTORS.*
*WILLIAM T. MILLER*
*JOHN T. MAYNARD*
BY *Roland A. Anderson*
*Attorney*

Patented Jan. 20, 1953

2,626,254

UNITED STATES PATENT OFFICE 2,626,254

METHOD OF POLYMERIZING TRIFLUORO-CHLOROETHYLENE

William T. Miller, Ithaca, N. Y., and John T. Maynard, Wilmington, Del., assignors to the United States of America as represented by the United States Atomic Energy Commission Application November 29, 1948, Serial No. 62,592

11 Claims. (Cl. 260—92.1)

This invention relates to a method of preparing halogen containing polymers and more particularly to a method of preparing polymers consisting essentially of carbon and halogen with a high fluorine content.

In recent years polymers consisting substantially of carbon and halogen with a high percentage of fluorine, because of their high degree of inertness, have come to be of great interest for various applications in industries in which corrosive substances are used. The plastics, which are polymers of this type having substantial mechanical strength, are of particular interest as materials of construction in these industries.

One very useful method of preparing the plastics is to carry out the polymerization of a suitable olefin in the presence of a halogen substituted acetyl peroxide as a polymerization promoter. The mechanism of the polymerization is such that the promoter decomposes, forming free radicals, and occasionally fragments of the promoter enter the polymeric chains. An advantage of this type of process is that the halogen substituted acetyl peroxides contribute little hydrogen to the products, which hydrogen tends to decrease their inertness; and this is particularly true of the completely halogen substituted acetyl peroxides which contribute no hydrogen. It has been found that when the polymerization is carried out at relatively low temperatures, plastics of higher molecular weight are produced; and that relatively low temperature polymerization can be carried out employing the completely halogen substituted acetyl peroxides which are active at these low temperatures. Thus, the latter peroxides are active and decompose already at about room temperature. Also, they are sensitive to shock and sometimes decompose with explosive violence. Therefore, in the purification, handling and storage of these peroxides it is necessary that they be maintained at a temperature below about 0° C., and it is desirable that they be kept in the form of a dilute solution in a halogenated organic solvent such as trichlorofluoromethane. Such precautionary measures are in some cases difficult to carry out, and tend to increase the cost of the process.

It is therefore an important object of the invention to provide a more convenient and economical method of preparing polymers consisting essentially of carbon and halogen with a high fluorine content in the presence of a completely halogen substituted acetyl peroxide as a promoter. Other objects will become evident in the course of the description.

According to the invention, a compound selected from the group of completely halogen substituted acetyl halides and completely halogen substituted acetic acid anhydrides is caused to react with an inorganic peroxide to form the corresponding substituted acetyl peroxide, in situ in a polyfluorinated olefin consisting of carbon and halogen of at least 2 and preferably of 2 to 4 carbon atoms; and then the olefin is polymerized in the presence of the thus produced organic peroxide as a polymerization promoter. It has been found that the formation of the organic peroxide in situ and the polymerization may be made to take place in a single operation, that is, under the same conditions, particularly temperature. Further, it has been found that formation of the peroxide takes place at temperatures below the temperatures at which it decomposes and promotes polymerization at an effective rate. It is preferred to maintain the reaction mixture first at a relatively low temperature at which the peroxide forms and at which its decomposition is very slow, the former reaction being allowed to progress until a desired concentration of the peroxide in the olefin is built up; and thereafter warm the reaction mass to a temperature at which the peroxide decomposes at a moderate, useful rate and promotes polymerization. Using this two stage process, high yields of polymer having useful properties as plastics have been obtained. In addition, this process permits, between the step of forming the peroxide promoter and the step of polymerization, filtering the reaction mass to remove substances such as inorganic peroxides or oxides whereby products of greater purity may subsequently be obtained.

The concentration of the organic peroxide may be determined prior to polymerization and may be brought to a desired value. Relatively low concentrations of the peroxide tend to produce polymers of relatively high molecular weight, and vice versa, so that reproducibility of the products depends to some extent on reproducibility of the peroxide concentration. Hence the two stage process is of value with respect to control of the products.

The temperature at which polymerization should be carried out depends on the particular organic peroxide that is formed in situ. The criterion is that the temperature should be within a range in which the peroxide decomposes at a moderate, regulated non-violent rate and is an active polymerization promoter. The temperature range will vary among the individual peroxide promoters. Formation of the promoter in situ may be carried out under the same conditions or alternatively may be carried out at relatively lower temperatures at which its decomposition is very slow, resulting in the benefits described above. In general, the completely halogen substituted acetyl peroxides are active already at about room temperature. In the case of trichloroacetyl peroxide, a useful temperature range for carrying out both reactions is $-25°$ C. to $10°$ C. and better $-20°$ C. to $0°$ C. but it is preferred to maintain the reaction mixture at a temperature below $-25°$ C. to form the peroxide in desired concentration, and thereafter warm the reaction mass to a temperature between $-25°$ C. and $10°$ C. and better between $-20°$ C. and $0°$ C. and bring about polymerization. It has been found that the concentration of the peroxide promoter reaches a maximum in 3 to 6 hours so that the lowest temperature stage of the process is completed in a short time. In comparison, longer periods of very low temperature refrigeration are needed to prevent the decomposition of the peroxide when it is separately prepared and stored for use as required.

It has been found that preparation of the promoter in situ in the olefin is feasible and does not interfere with the polymerization. The olefin is capable of serving as a solvent for the substituted acetyl halide or anhydride thus facilitating reaction. Simple filtration, extraction and washing procedures may be used to obtain the products in a useful, pure state.

The term "inorganic peroxide" is used herein in the narrow sense to signify an inorganic compound in which two oxygen atoms are connected by a single bond. The inorganic peroxides comprise hydrogen peroxide, the alkali metal peroxides and the alkaline earth metal peroxides.

In the following description, one property of the polymers designated the N. S. T., or no strength temperature, which provides an indication of relative molecular weight, will be referred to. The N. S. T. may be measured by a procedure set forth in application Serial No. 730,176, filed February 21, 1947, by W. T. Miller. As described in that application, in measuring N. S. T. a specific apparatus is used as illustrated in the drawings wherein:

Figure 1 is an elevation of an N. S. T. measuring apparatus with the heating unit in vertical section.

Figure 1:
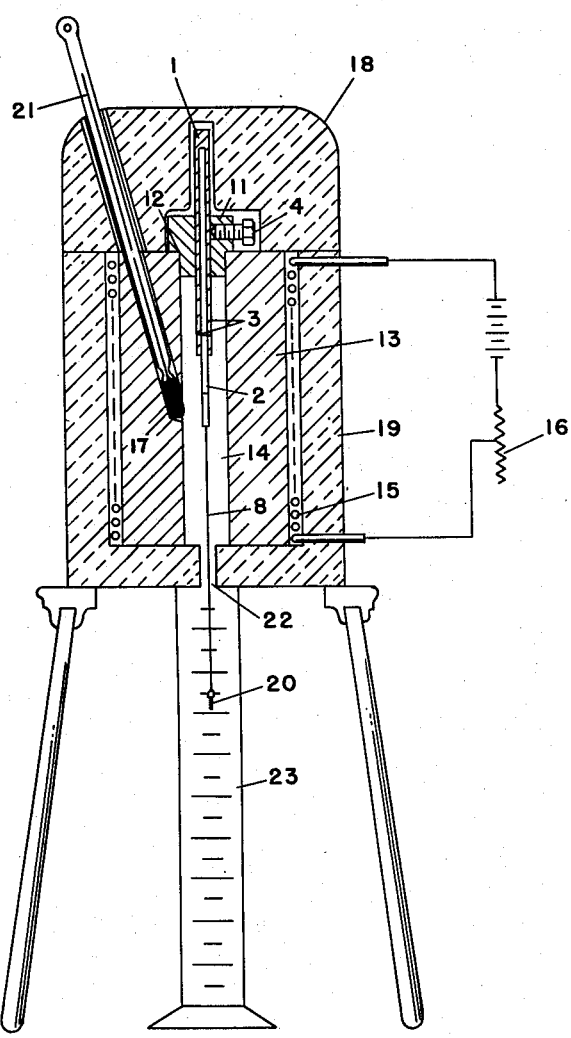
Figure 2:
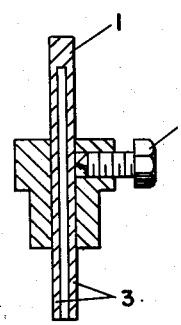
Figure 2 is a detail view of the test sample and sample clamp, the clamp being partly shown in axial section.

As shown in Figs. 1 and 2 the sample 2 is clamped between the jaws 3 of the clamp 1 by tightening the set screw 4. The clamp 1 is an extension of the plug 11 which is inserted into the bore 14 of the tube 13. The plug 11 serves to center the sample 2 in the bore 14 of the tube 13 and the flange 12 limits the extent to which the plug may be inserted in the bore. The tube 13 is heated by electrical heating element 15. The temperature of the heating element is controlled by a resistance 16. The temperature of the block is measured by a thermometer 21 in thermometer well 17. The apparatus is thermally insulated by the insulating members 18 and 19 and member 18 can be removed to give access to the plug 11. A weight 20 is attached to sample 2 by a free hanging wire 8 which passes through the insulation 19 at hole 22. A scale 23 serves to indicate the movement of the weight 20. The test is performed by clamping a sample of specified dimensions of polymer into the clamp as shown in Figure 2, placing it in the heater in the position shown in Figure 1, and heating it slowly until it breaks. The dimensions of each sample must be reproduced to careful specifications. The sample 2 is notched at the center 6 to insure its breaking at this point.

Figure 3:
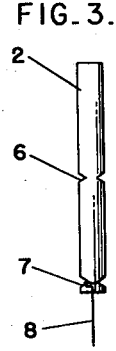
Figure 3 is a detail view of the test sample.

A sample of polymer hot pressed into a $\frac{1}{16}''$ thick sheet, is cut into a strip $\frac{1}{8}''$ by $\frac{1}{16}''$ by $2''$ and notched as indicated in Figs. 2 and 3 to a thickness of $\frac{3}{64}$ by $\frac{1}{16}''$ at notch 6. A fine wire 8 and weight 20 are attached to the lower end at the notch 7 so that the total weight from the notch 6 down is 0.5 gram. The temperature of the sample is increased at the rate of about $1.5°$ C. per minute as the breaking temperature is approached by slowly increasing the potential across the heating element 15.

The method of the invention is illustrated by the following examples:

Example 1

A glass bomb was charged with 3 gs. 88% barium peroxide ($BaO_2$), 20 ccs. trifluoromonochloroethylene ($CF_2=CFCl$), and $\frac{1}{3}$ cc. trichloroacetyl chloride ($CCl_3COCl$), sealed and maintained at $0°$ C. for 64 hours. It was then opened and the residual monomer permitted to evaporate. The polytrifluoromonochloroethylene was treated with boiling carbon tetrachloride ($CCl_4$) to extract impurities, filtered, washed with hot $CCl_4$ and dried. The product having a N. S. T. of $239°$ C. was recovered in 14% yield.

Example 2

A glass bomb was charged with about 42 gs. trifluoromonochloroethylene, 6 gs. 88% $BaO_2$ and 1 cc. $CCl_3COCl$, and maintained at $-20°$ C. for 8 days. After extraction with hot $CCl_4$ and drying, a yield of 19% of plastic polytrifluoromonochloroethylene was obtained.

Example 3

A mixture of 7 gs. $CCl_3COCl$, 250 ccs. $CF_2=CFCl$ and 70 gs. $BaO_2$ was stirred for $7\frac{1}{2}$ hours at $-30°$ C., filtered and transferred to glass tubes. The tubes were maintained at $0°$ C. for 10 days. On working up the products, a yield of about 65% of polytrifluoromonochloroethylene, N. S. T. about $220°$ C., was obtained.

Example 4

A mixture of 300 ccs. $CF_2=CFCl$, 10 gs. $CCl_3COCl$ and 4.6 gs. sodium peroxide ($Na_2O_2$) was stirred at $-30°$ C. At intervals, samples of the reaction mixture were removed and filtered and analyzed for bistricholoroacetyl peroxide content. This was done by adding to the sample a solution of ethyl alcohol, glacial acetic acid and potassium iodide and titrating with a standard sodium thiosulfate solution; and the following results were obtained:

| Time (hrs.) | Weight Percent $(CCl_3CO_2)_2$ |
|---|---|
| $1\frac{1}{2}$ | .01 |
| $3\frac{3}{4}$ | .022 |
| $6\frac{1}{2}$ | .022 |

At the end of this time samples were filtered and transferred to individual glass tubes and were treated in the following manner.

Sample No. 1 was maintained at $0°$ C. for about $1\frac{1}{2}$ days. After extraction of impurities with hot $CCl_4$ an 8% yield of polytrifluoromonochloroethylene, N. S. T. $271°$ C., was obtained.

Sample No. 2 was maintained for 3 days at a temperature which varied between 0° C. and 10° C. After extraction with hot $CCl_4$ a 12% yield of the polymer, N. S. T. 284° C., was obtained.

Sample No. 3 was maintained at −20° C. for 2 days and then allowed to warm slowly to room temperature. After extraction with hot $CCl_4$, a 13% yield of polytrifluoromonochloroethylene, N. S. T. 264° C., was obtained.

*Example 5*

The same reactants were mixed as set forth in Example 4, with the exception that the quantities of $CCl_3COCl$ and of $Na_2O_2$ were tripled. The reactants were stirred at −30° C. for 5½ hours after which time the trichloroacetyl peroxide content measured .189% by weight. Samples were filtered and transferred to glass tubes and treated in the following manner.

Sample No. 1 was maintained at 0° C. for nearly all of 2½ days except that it was warmed to 10° C. for the last few hours. After extraction polytrifluoromonochloroethylene, N. S. T. 232° C. in 30% yield, was obtained.

Sample No. 2 was held at −20° C. for about 1 day and was then allowed to warm slowly to room temperature. Polytrifluoromonochloroethylene was obtained in 27% yield.

The method of the present invention is particularly useful when applied to polyfluorinated olefins consisting of carbon and halogen of 2 to 4 carbon atoms and when completely halogen substituted-acetyl halides or -acetic acid anhydrides are used. Other examples of such olefins are tetrafluoroethylene, hexafluorobutadiene - 1,3, hexafluoro propene, asymmetric difluorodichloroethylene and mixtures such as a mixture of tetrafluoroethylene and trifluoromonochloroethylene and a mixture of trifluoromonochloroethylene and hexafluoropropene. Other examples of the acetyl compound are dichlorofluoroacetyl chloride and trifluoroacetic anhydride. However, the invention is also applicable to other completely halogenated olefins and to other halogenated olefins of 2 to 4 carbon atoms such as vinyl chloride and asymmetric dichloroethylene, and other halogen substituted-acetyl halides or -acetic acid anhydrides may be used such as mono- and di-chloroacetyl chloride and difluoroacetyl chloride.

The process of this invention may be employed to prepare normally liquid polymers as well as normally solid polymers without departing from the scope thereof. The process may be carried out in either a batchwise or continuous manner. In producing polymer oils, a continuous process is particularly feasible. For example, the halogen substituted acetyl halide or acetic acid anhydride may be admixed with and dissolved in the monomer. The resulting mixture is continuously passed through a first reaction zone in the presence of an inorganic peroxide. The inorganic peroxide may be in situ in the reaction zone or continuously added thereto in the desired proportions. The temperature conditions maintained in the reaction zone are relatively low but favorable to the formation of the organic peroxide. A liquid effluent comprising monomer and organic peroxide is removed from the reaction zone and passed to a second reaction zone maintained at a higher temperature favorable to the polymerization of the monomer to oils. An oil comprising the polymer product is continuously withdrawn from the second reaction zone. For a more detailed discussion of the conditions of reaction in the polymer oil production, reference may be had to application Serial No. 743,455, William T. Miller, filed April 23, 1947.

By means of the present invention a convenient and inexpensive method of preparing useful plastic materials is provided. Since many embodiments might be made of the present invention and since many changes might be made in the embodiment described, it is to be understood that the foregoing description is to be interpreted as illustrative only and not in a limiting sense.

We claim:

1. The method of preparing polytrifluoromonochloroethylene which comprises maintaining a compound selected from the group consisting of completely halogen substituted acetyl halides and completely halogen substituted acetic acid anhydrides, said halogen being selected from the group consisting of fluorine and chlorine, which is in solution in trifluoromonochloroethylene, in contact with an inorganic metal peroxide, to produce the peroxide of said compound in situ, and decomposing the peroxide so formed by maintaining the same at a temperature at which it decomposes while still in contact with said trifluoromonochloroethylene, thereby causing the latter to polymerize.

2. The method of preparing polytrifluoromonochloroethylene which comprises maintaining trichloroacetyl chloride in contact with an inorganic metal peroxide in situ in trifluoromonochloroethylene to produce bis-trichloroacetyl peroxide and maintaining the reaction mass at a temperature to decompose the peroxide so formed while still in contact with said trifluoromonochloroethylene thereby causing said trifluoromonochloroethylene to polymerize forming a solid polymer.

3. The method of preparing polytrifluoromonochloroethylene which comprises maintaining trichloroacetyl chloride in contact with barium peroxide in situ in trifluoromonochloroethylene to produce bis-trichloroacetyl peroxide and maintaining the reaction mass at a temperature to decompose the peroxide so formed while still in contact with said trifluoromonochloroethylene thereby causing said trifluoromonochloroethylene to polymerize forming a solid polymer.

4. The method of preparing polytrifluoromonochloroethylene which comprises maintaining trichloroacetyl chloride in contact with sodium peroxide in situ in trifluoromonochloroethylene to produce bis-trichloroacetyl peroxide and maintaining the reaction mass at a temperature to decompose the peroxide so formed while still in contact with said trifluoromonochloroethylene thereby causing the trifluoromonochloroethylene to polymerize forming a solid polymer.

5. The method of preparing polytrifluoromonochloroethylene which comprises maintaining trichloroacetyl chloride in contact with an inorganic metal peroxide in situ in trifluoromonochloroethylene to produce bis-trichloroacetyl peroxide and maintaining the reaction mass at a temperature to decompose the peroxide so formed while still in contact with said trifluoromonochloroethylene thereby causing the trifluoromonochloroethylene to polymerize forming a solid polymer, the foregoing reaction steps being carried out at a temperature in the range of −25° C. to 10° C.

6. The method of preparing polytrifluoromonochloroethylene which comprises maintaining trichloroacetyl chloride in contact with an inorganic metal peroxide in situ in trifluoromonochloroethylene to produce bis-trichloroacetyl peroxide and maintaining the reaction mass at a temperature to decompose the peroxide so formed while still in contact with said trifluoromonochloroethylene thereby causing the trifluoromonochloroethylene to polymerize forming a solid polymer, the foregoing steps being carried out at a temperature in the range of $-20°$ C. to $0°$ C.

7. The method of preparing polytrifluoromonochloroethylene which comprises maintaining trichloroacetyl chloride in contact with an inorganic peroxide at a relatively low temperature in situ in trifluoromonochloroethylene to build up a desired concentration of bis-trichloroacetyl peroxide and thereafter raising the temperature of the reaction mass to decompose the latter peroxide at a moderate rate and cause the trifluoromonochloroethylene to polymerize forming a solid polymer.

8. The method of polymerizing trifluoromonochloroethylene which comprises maintaining trichloroacetyl chloride in contact with an inorganic peroxide at a temperature below $-25°$ C. in situ in trifluoromonochloroethylene to build up a desired concentration of bis-trichloroacetyl peroxide and thereafter warming the reaction mass to a temperature between $-25°$ C. and $10°$ C. to decompose the latter peroxide and cause the trifluoromonochloroethylene to polymerize forming a solid polymer.

9. The method of polymerizing trifluoromonochloroethylene which comprises maintaining trichloroacetyl chloride in contact with an inorganic peroxide at a temperature below $-25°$ C. in situ in trifluoromonochloroethylene to build up a desired concentration of bis-trichloroacetyl peroxide and thereafter warming the reaction mass to a temperature between $-20°$ C. and $0°$ C. to decompose the latter peroxide and cause the trifluoromonochloroethylene to polymerize forming a solid polymer.

10. The method of polymerizing trifluoromonochloroethylene which comprises maintaining trichloroacetyl chloride in contact with an inorganic peroxide at a temperature of about $-30°$ C. in situ in trifluoromonochloroethylene to build up a desired concentration of bis-trichloroacetyl peroxide and thereafter maintaining the reaction mass at a temperature between $-20°$ C. and $0°$ C. to decompose the latter peroxide and cause the trifluoromonochloroethylene to polymerize forming a solid polymer.

11. The method of polymerizing trifluoromonochloroethylene which comprises maintaining trichloroacetyl chloride in contact with an inorganic peroxide at a temperature below $-25°$ C. in situ in trifluoromonochloroethylene to build up a desired concentration of bis-trichloroacetyl peroxide, and thereafter filtering the reaction mass and then warming the reaction mass to a temperature between $-20°$ C. and $0°$ C. to decompose the latter peroxide and cause the trifluoromonochloroethylene to polymerize forming a solid polymer.

WILLIAM T. MILLER.
JOHN T. MAYNARD.

REFERENCES CITED

The following references are of record in the file of this patent:

UNITED STATES PATENTS

| Number | Name | Date |
| --- | --- | --- |
| 2,333,633 | Britton | Nov. 9, 1943 |
| 2,490,800 | Greenspan | Dec. 13, 1949 |
| 2,531,134 | Kropa | Nov. 21, 1950 |
| 2,580,373 | Zimmerman | Dec. 25, 1951 |

OTHER REFERENCES

Miller et al., Ind. Eng. Chem., 39, 333–337 (March 1947).

Whitmore: "Organic Chemistry," page 295; Van Nostrand (1937).